Oct. 23, 1956 J. M. JAREMA ET AL 2,768,324
PUSH-PULL SYNCHROSCOPE SWEEP CIRCUIT
Filed Sept. 25, 1953
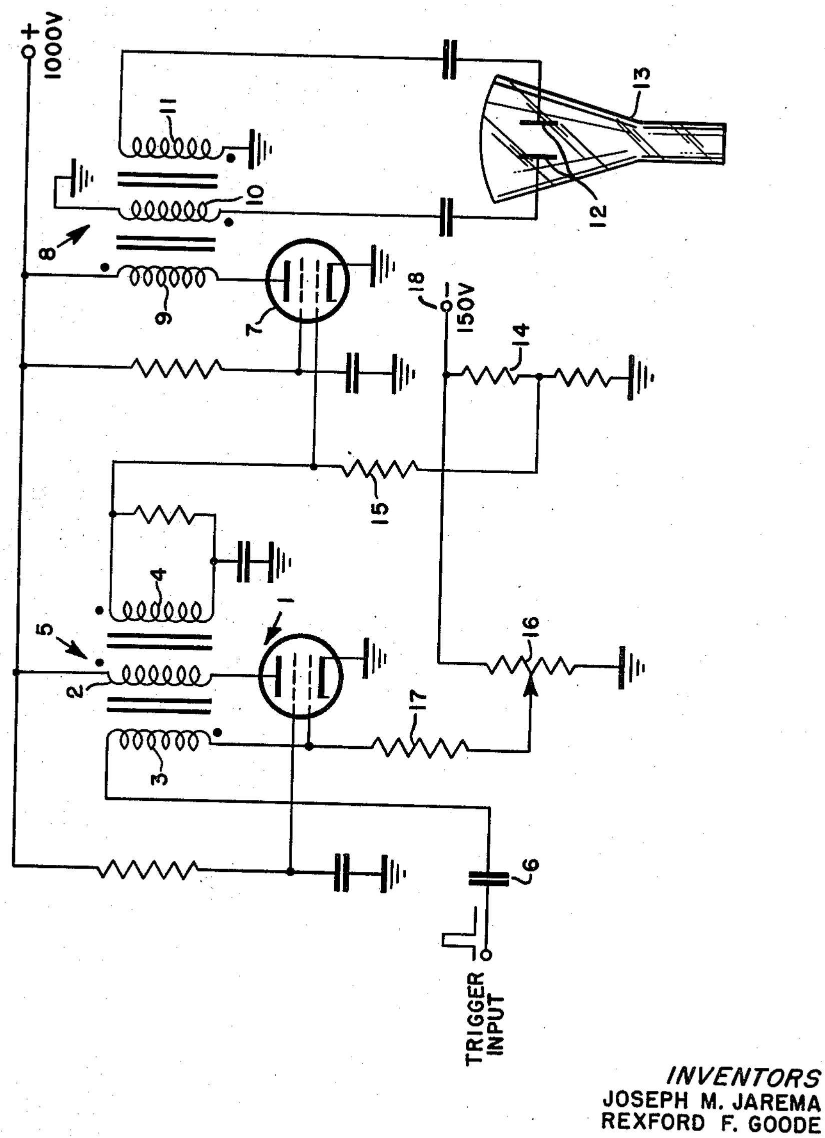
INVENTORS
JOSEPH M. JAREMA
REXFORD F. GOODE
BY W. R. Maltby
D. C. Snyder
ATTORNEYS 2,768,324

PUSH-PULL SYNCHROSCOPE SWEEP CIRCUIT

Joseph M. Jarema, Wakefield, Mass., and Rexford F. Goode, Washington, D. C.

Application September 25, 1953, Serial No. 382,488

5 Claims. (Cl. 315—26)

(Granted under Title 35, U. S. Code (1952), sec. 266)

The invention described herein may be manufactured and used by or for the Government of the United States of America for governmental purposes without the payment of any royalties thereon or therefor.

The present invention relates generally to electronic display devices, such as, for example, cathode ray oscilloscopes, and more particularly to apparatus for and methods of generating wave forms for use as sweep voltages in high speed electron beam deflecting systems of the electrostatic type.

Most techniques and circuit arrangements currently employed for generating sweep voltages for cathode ray beam deflecting systems depend primarily upon the exponential charging or discharging characteristic of RC networks for giving the necessary rate of voltage rise and linearity. While the sweep voltages obtained from circuits of this type are generally satisfactory for display systems wherein moderately fast writing speeds are required, they cannot, however, be efficiently employed in that class of laboratory measuring instruments, such as synchroscopes, where writing speeds in the order of 200 inches per microsecond, with a tube sensitivity of approximately 200 volts per inch, are needed for examining extremely brief transient video pulses.

It is, accordingly, a primary objective of the present invention to provide a sweep generator capable of producing voltage wave forms having extremely high rate-of-rise characteristics.

A secondary object of the present invention is to provide a push-pull sweep voltage generator capable of producing high amplitude voltage wave forms having increased rate-of-rise characteristics.

A further objective of the present invention is to generate push-pull sweep voltages with high amplitude and rate-of-rise characteristics for cathode ray beam deflecting systems.

A still further objective of the present invention is to provide a simple and inexpensive method for obtaining high speed sweeping of electron beams in electrostatic beam deflecting systems.

Other objectives and many of the attendant advantages of this invention will be readily appreciated as the same becomes better understood by reference to the following detailed description and when considered in connection with the accompanying drawing, the single figure of which is a schematic illustration of a preferred embodiment thereof.

Briefly and in general terms, the present invention accomplishes the above objectives by utilizing the voltage rise of a blocking oscillator pulse as the desired sweep voltage. A blocking oscillator of conventional design is adapted to be periodically triggered by an external source of synchronized pulses and the output of this oscillator is coupled to a phase-inverting stage having a multiple-winding pulse transformer in its output circuit which develops symmetrical voltages of high rate-of-rise and amplitude characteristics.

Referring now to the figure, a blocking oscillator of conventional design, with its anode and control grid circuits regeneratively intercoupled by windings 2 and 3 of pulse transformer 5, is generally represented by reference character 1.

Voltage source 18 is effective through resistance network 14, 16 and 17 to apply sufficient negative bias to the control grid of the blocking oscillator tube to maintain it normally inoperative. A suitable source of positive trigger pulses (not shown) is coupled to the control grid of this oscillator via capacitor 6 and winding 3 for periodically overcoming this bias and initiating thereby a single cycle of oscillator operation. A third winding of pulse transformer 5, element 4, is so coupled and wound with respect to winding 2 that it produces a positive pulse in response to each activation of the blocking oscillator. The shape of this pulse, as is well known, is of substantially rectangular configuration and the high slope of its leading edge is effectively utilized in the present system to provide the high speed sweep voltage. The positive output pulse from blocking oscillator 1 is directly coupled to the control grid of tetrode 7, which is normally biased to cutoff by resistance networks 14 and 15 from voltage source 18, and which includes a multiple-winding pulse transformer 8 in its anode circuit. Secondary windings 10 and 11 of this transformer have their opposite end turns grounded so that the voltages taken from their ungrounded sides have different signs. These output voltages, corresponding in wave form to the blocking oscillator pulse, are fed in turn by suitable capacitor coupling means to the deflecting plates 12 of cathode ray tube 13.

A single cycle of operation of the above circuit will now be presented. With the appearance of a positive input trigger pulse on the control grid of the blocking oscillator electron tube, this tube is immediately rendered fully conducting. This condition obtains because of the regenerative nature of the latter's anode and grid circuits and, consequently, the leading edge of the negative pulse produced in winding 2 has an extremely high slope. Both the duration of this pulse and its shape, as is well known, are determined, for the most part, by the saturation characteristics of the blocking oscillator tube and the magnitude of the RC time constant of the grid cathode circuit of this tube. Because of the transformer action of windings 2 and 4, the pulse developed in winding 4 has a positive sign. This pulse institutes conduction in tetrode 7 and the production of a negative pulse in winding 9. By virtue of the specific connections and winding directions of windings 10 and 11, the output pulses taken from their ungrounded sides have different signs. These pulses correspond to the desired push-pull voltages and when applied to the deflecting plates 12 of cathode ray tube 13 give the high speed beam deflection sought.

In one physical embodiment of the present invention with tube type 6AR6 constituting the electronic discharge members of both the blocking oscillator and phase inverter and with approximately 1,000 volts positive on the anodes of these tubes and with voltage source 18 approximately 150 volts negative, it is possible to obtain a blocking oscillator output pulse of $10^{-7}$ seconds with 700 volts amplitude. Thus, the push-pull sweep voltages taken off the secondary windings 10 and 11 are in the order of 1,400 volts. It is evident, however, that the cathode ray beam can be intensified, by means well known in the art, for example, by pulses derived from the source of trigger pulses, so that the linear portions of these push-pull sweep voltages are used to produce visible beam deflection.

Obviously many modifications and variations of the present invention are possible in the light of the above teachings. It is therefore to be understood that within the scope of the appended claims the invention may be practiced otherwise than as specifically described.

What is claimed is:

1. In a high speed electron beam deflecting system the combination of, a blocking oscillator, means for periodically applying trigger pulses to said oscillator to produce positive pulses of substantially rectangular configuration, an electron discharge member having input and output circuits, a pulse transformer having a plurality of windings, means for coupling one winding of said transformer to the output circuit of said electron discharge member, means for feeding said positive pulses directly to the input circuit of said electron member whereby output pulses of similar wave form but opposite sign are produced in a second and third winding of said transformer and means for directly coupling said output pulses to one set of deflecting electrodes of an electrostatic cathode ray tube.

2. In a high speed electron beam deflecting system the combination of, a blocking oscillator, means for periodically triggering said oscillator to produce positive pulses of substantially rectangular configuration, an electron discharge tube having at least control grid and anode circuits, a pulse transformer having an input winding and a pair of output windings, means for connecting said input winding in the anode circuit of said electron discharge tube, means for coupling said positive pulses directly to the control grid circuit of said electron tube whereby output pulses of similar wave form but opposite sign are generated in said output windings and means for coupling said output windings to the deflecting plates of an electrostatic cathode ray tube.

3. In a high speed electron beam deflecting system the combination of, a blocking oscillator, means for periodically applying trigger pulses to said oscillator to produce thereby positive pulses of substantially rectangular shape, an electron discharge tube having at least control grid and anode circuits, means for biasing said control grid circuit whereby said electron discharge tube is normally maintained nonconducting, a pulse transformer having a primary winding and a pair of secondary windings, means for connecting said primary winding in the anode circuit of said electron discharge tube, means for supplying said positive pulses directly to the control grid circuit of said electron discharge tube whereby said tube is rendered conductive and whereby output pulses of similar wave form but opposite sign are produced across said secondary windings, and means for feeding said output pulses to the deflecting plates of an electrostatic cathode ray tube.

4. In a high speed electron beam deflecting system the combination of a blocking oscillator, means for periodically activating said oscillator to produce positive pulses, an electron discharge tube having at least control grid and anode circuits, means for biasing said control grid circuit to maintain said electron tube normally nonconducting, a pulse transformer having a first, second and third winding, means for connecting said first winding in the anode circuit of said electron discharge tube, means for grounding opposite end turns of said second and third windings, means for connecting the ungrounded end turns of said second and third windings to the deflecting electrodes of a cathode ray tube, and means for feeding said positive pulses directly to the control grid circuit of said electron discharge tube whereby said bias is overcome and whereby said discharge tube is rendered conductive to produce at the ungrounded sides of said secondary windings symmetrical wave forms of opposite sign for push-pull deflection of the cathode ray beam of said cathode ray tube.

5. In a high speed electron beam deflecting system the combination of, a blocking oscillator, means for periodically activating said oscillator to produce positive pulses, an electron discharge tube having at least a control grid, cathode and anode, means for connecting said cathode to a reference potential, a pulse transformer having first, second and third windings, means for connecting said anode in series with said first winding to a source of operating potential, means for grounding opposite end turns of said second and third windings, means for connecting the ungrounded end turns of said second and third windings to the deflecting electrodes of an electrostatic cathode ray tube, means for biasing said control grid whereby said electron tube is normally maintained inoperative and means for coupling said positive pulses directly to said control grid for overcoming said biasing means and for producing at the ungrounded sides of said second and third windings output pulses of similar wave form but opposite sign, said voltages serving as the sweep voltages for said cathode ray beam.

References Cited in the file of this patent

UNITED STATES PATENTS

| | | |
|---|---|---|
| 2,278,514 | Florman | Apr. 7, 1942 |
| 2,596,590 | Overton | May 13, 1952 |
| 2,654,050 | Reinhard | Sept. 29, 1953 |